United States Patent
Boss et al.

(10) Patent No.: US 8,804,042 B2
(45) Date of Patent: Aug. 12, 2014

(54) PREEMPTIVE PRELOADING OF TELEVISION PROGRAM DATA

(71) Applicant: International Business Machines Corporation, Armonk, NY (US)

(72) Inventors: Gregory J. Boss, Saginaw, MI (US); James R. Kozloski, New Fairfield, CT (US); Clifford Alan Pickover, Yorktown Heights, NY (US); Anne R. Sand, Canon City, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/740,741

(22) Filed: Jan. 14, 2013

(65) Prior Publication Data

US 2014/0198254 A1    Jul. 17, 2014

(51) Int. Cl.
   *H04N 5/50*    (2006.01)

(52) U.S. Cl.
   USPC ........... 348/570; 348/571; 348/522; 348/510; 348/706; 348/714; 348/719; 348/725; 348/729; 348/731; 348/732; 348/734; 348/739; 348/14.03; 348/231.3; 725/34; 725/38; 725/39; 725/40; 725/44; 725/46; 725/47; 725/50; 725/55; 725/56; 725/58; 725/68; 725/72; 725/86; 725/93; 725/94; 725/96; 725/100; 725/109; 725/110; 725/115; 725/116; 725/140; 725/142; 725/152; 715/700; 715/707; 715/727; 715/733; 715/737; 715/748; 715/762; 375/240.08; 375/240.12; 375/240.25

(58) Field of Classification Search
   USPC ......... 348/570, 734, 731, 571, 522, 510, 725, 348/729, 732, 739, 706, 714, 719, 14.03, 348/231.3; 725/109, 44, 46, 38, 34, 39, 40, 725/47, 50, 55, 56, 58, 68, 72, 86, 93, 94, 725/96, 100, 110, 115, 116, 140, 142, 152; 715/700, 707, 727, 733, 737, 748, 762; 375/240.08, 240.12, 240.25
   See application file for complete search history.

(56) References Cited

U.S. PATENT DOCUMENTS

| | | | |
|---|---|---|---|
| 6,055,527 A | 4/2000 | Badger et al. |
| 6,636,250 B1 | 10/2003 | Gasser |
| 6,788,882 B1 | 9/2004 | Geer et al. |

(Continued)

OTHER PUBLICATIONS

Wen et al, "Hybrid Tree Based Explicit Routed Multicast for QoS Supported IPTV Service", IEEE Globecom, 2009 Proceedings, 6 pages.

(Continued)

*Primary Examiner* — Jefferey Harold
*Assistant Examiner* — Mustafizur Rahman
(74) *Attorney, Agent, or Firm* — Cantor Colburn LLP; Vazken Alexanian

(57) ABSTRACT

Digital television channels are preemptively cached based on a modeling of a user to reduce delays while switching channels. A current television channel is selected using a first tuner. A future television channel selection of the user is then predicted based on a modeling of the user. The recorded content of the predicted future television channel is preemptively cached using a second tuner. A buffer of the recorded content of the predicted future television channel is displayed when the user switches from the current television channel to the predicted future television channel. The modeling of the user is updated and stored in storage.

13 Claims, 4 Drawing Sheets

(56) References Cited

U.S. PATENT DOCUMENTS

| | | |
|---|---|---|
| 7,298,425 B2 | 11/2007 | Klein |
| 7,614,264 B2 | 11/2009 | Mc Gettrick |
| 2004/0107439 A1* | 6/2004 | Hassell et al. ............... 725/44 |
| 2004/0194134 A1 | 9/2004 | Gunatilake et al. |
| 2005/0028208 A1* | 2/2005 | Ellis et al. ............... 725/58 |
| 2005/0094733 A1* | 5/2005 | Daniell ............... 375/240.25 |
| 2006/0212904 A1 | 9/2006 | Klarfeld et al. |
| 2007/0171306 A1 | 7/2007 | Lowet et al. |
| 2008/0052739 A1* | 2/2008 | Logan ............... 725/25 |
| 2008/0092168 A1* | 4/2008 | Logan et al. ............... 725/44 |
| 2008/0288979 A1* | 11/2008 | Smoyer et al. ............... 725/39 |
| 2008/0320517 A1 | 12/2008 | Beadle et al. |
| 2009/0089184 A1* | 4/2009 | Boush ............... 705/27 |
| 2009/0119725 A1 | 5/2009 | Park et al. |
| 2009/0325483 A1* | 12/2009 | May ............... 455/41.1 |
| 2010/0138864 A1* | 6/2010 | Yoakum ............... 725/44 |
| 2010/0162292 A1* | 6/2010 | Potrebic et al. ............... 725/27 |
| 2010/0183285 A1* | 7/2010 | Heath et al. ............... 386/109 |
| 2010/0289819 A1 | 11/2010 | Singh et al. |
| 2010/0293584 A1 | 11/2010 | Civanlar et al. |
| 2010/0319043 A1* | 12/2010 | Jain et al. ............... 725/110 |
| 2011/0138416 A1* | 6/2011 | Kang et al. ............... 725/39 |
| 2011/0249026 A1 | 10/2011 | Singh |
| 2011/0310121 A1 | 12/2011 | Baron |
| 2012/0066719 A1* | 3/2012 | Ellis et al. ............... 725/51 |
| 2012/0069247 A1 | 3/2012 | Morikawa et al. |
| 2012/0131627 A1 | 5/2012 | Chittella |
| 2012/0230655 A1* | 9/2012 | Potrebic et al. ............... 386/297 |
| 2013/0171594 A1* | 7/2013 | Gorman et al. ............... 434/219 |

OTHER PUBLICATIONS

Kim et al, "Reducing IPTV Channel Zapping Time Based on Viewer's Surfing Behavior and Preference", Broadband Multimedia Systems and Broadcasting, 2008 IEEE International Symposium, 6 pages.

Hsu et al, "AIMED—A Personalized TV Recommendation System", Springer, Lecture Notes in Computer Science, vol. 4471, 2007, 3 pages.

Non Final Office Action for U.S. Appl. No. 13/962,610, mailed Oct. 25, 2013, 15 pages.

Final Office Action for U.S. Appl. No. 13/962,610, mailed Feb. 20, 2014, 15 pages.

* cited by examiner

PREEMPTIVE PRELOADING OF TELEVISION PROGRAM DATA

BACKGROUND

The present invention relates to digital televisions, and more specifically, to providing improved television channel zapping times for digital televisions by preemptively caching future television channel selections based on a modeling of the user.

A zap time is the total duration from the time a viewer presses a channel change button to the time the new channel is displayed on a television along with corresponding audio. This delay exists in all television systems, but is greater in contemporary digital television systems. Contemporary digital television users often experience an inherent delay when switching between television broadcast channels. The one to three second delay commonly encountered by a user when channel zapping from one channel to the next can significantly hamper the user's quality of experience with the digital television.

SUMMARY

According to an embodiment, a computer-implemented method is provided for receiving, with a processing device, a current user selected television channel using a first tuner. A future television channel selection of the user is then predicted based on a modeling of the user. The recorded content of the predicted future television channel is preemptively cached using a second tuner. A buffer of the recorded content of the predicted future television channel is displayed when the user switches from the current television channel to the predicted future television channel. The modeling of the user is updated and stored in storage.

According another embodiment, a computer system comprising a processor, a system memory, and a bus that couples various system components including the system memory to the processor, the system configured to perform a method comprising receiving, with a processing device, a current user selected television channel using a first tuner. A future television channel selection of the user is then predicted based on a modeling of the user. The recorded content of the predicted future television channel is preemptively cached using a second tuner. A buffer of the recorded content of the predicted future television channel is displayed when the user switches from the current television channel to the predicted future television channel. The modeling of the user is updated and stored in storage.

According another embodiment, a computer program product comprising a computer readable storage medium having computer readable program code stored thereon that, when executed, performs a method, the method comprising receiving, with a processing device, a current user selected television channel using a first tuner. A future television channel selection of the user is then predicted based on a modeling of the user. The recorded content of the predicted future television channel is preemptively cached using a second tuner. A buffer of the recorded content of the predicted future television channel is displayed when the user switches from the current television channel to the predicted future television channel. The modeling of the user is updated and stored in storage.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments disclosed herein preemptively cache digital television channels to reduce the inherent pause experienced when a user switches channels. Embodiments preemptively buffer channels based on a prediction of a future channel selection by a user. The predicted future channel selections are determined based on a modeling of the user, which comprises factors including, but not limited to, a user's mood, social network, tendencies, and preferences.

Figure 1:
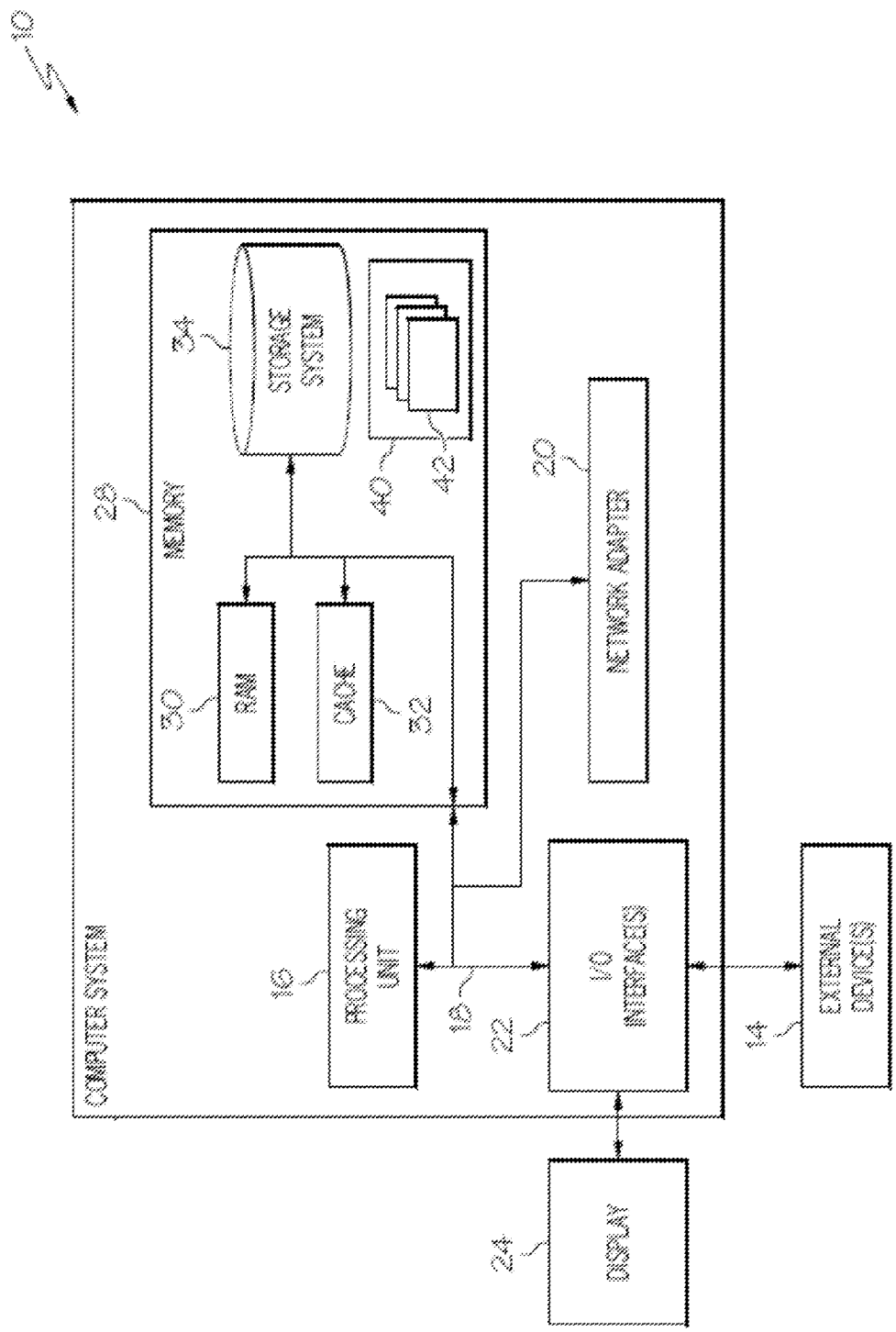
FIG. 1 depicts a block diagram of a computer system according to an embodiment of the invention.

Referring now to FIG. 1, a block diagram of a computer system 10 suitable for preemptively caching television channels based on a modeling of the user according to exemplary embodiments is shown. Computer system 10 is only one example of a computer system and is not intended to suggest any limitation as to the scope of use or functionality of embodiments described herein. Regardless, computer system 10 is capable of being implemented and/or performing any of the functionality set forth hereinabove.

Computer system 10 is operational with numerous other general purpose or special purpose computing system environments or configurations. Examples of well-known computing systems, environments, and/or configurations that may be suitable for use with computer system 10 include, but are not limited to, personal computer systems, server computer systems, thin clients, thick clients, cellular telephones, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 10 may be described in the general context of computer system-executable instructions, such as program modules, being executed by the computer system 10. Generally, program modules may include routines, programs, objects, components, logic, data structures, and so on that perform particular tasks or implement particular abstract data types. Computer system 10 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 10 is shown in the form of a general-purpose computing device. The components of computer system may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 10 may include a variety of computer system readable media. Such media may be any available media that is accessible by computer system/server 10, and it includes both volatile and non-volatile media, removable and non-removable media.

System memory 28 can include computer system readable media in the form of volatile memory, such as random access memory (RAM) 30 and/or cache memory 32. Computer system 10 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 10 may also communicate with one or more external devices 14 such as a keyboard, a pointing device, a display 24, etc.; one or more devices that enable a user to interact with computer system/server 10; and/or any devices (e.g., network card, modem, etc.) that enable computer system/server 10 to communicate with one or more other computing devices. Such communication can occur via Input/Output (I/O) interfaces 22. Still yet, computer system 10 can communicate with one or more networks such as a local area network (LAN), a general wide area network (WAN), and/or a public network (e.g., the Internet) via network adapter 20. As depicted, network adapter 20 communicates with the other components of computer system 10 via bus 18. It should be understood that although not shown, other hardware and/or software components could be used in conjunction with computer system 10. Examples include, but are not limited to: microcode, device drivers, redundant processing units, external disk drive arrays, RAID systems, tape drives, and data archival storage systems, etc.

Figure 2:
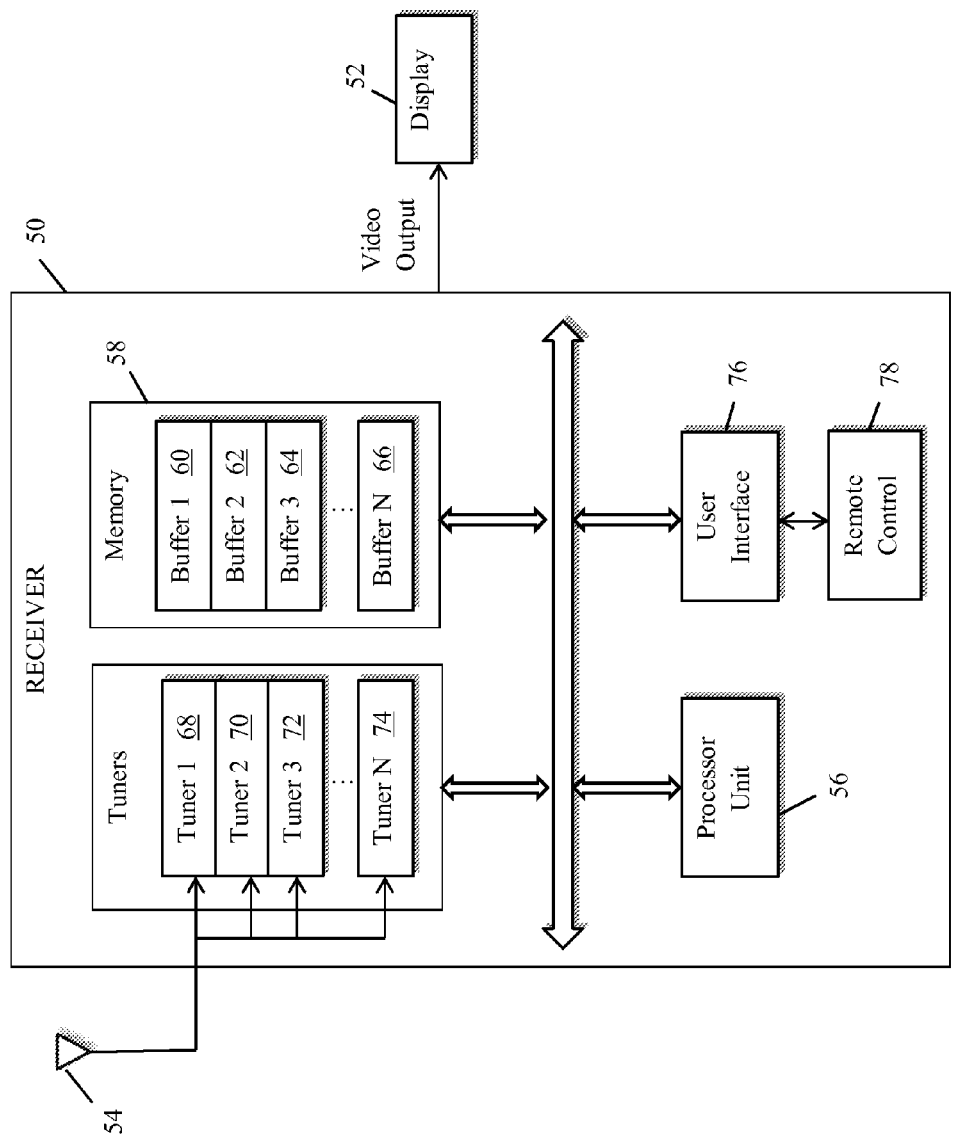
FIG. 2 depicts a block diagram of a digital video receiver system according to an embodiment of the invention.

Referring now to FIG. 2, a block diagram of a digital video receiver 50 is depicted in accordance with an illustrative embodiment. The receiver 50 may, for example, be implemented in the computer system 10 shown in FIG. 1. The receiver 50 is coupled to a display device 52. It should be noted that the receiver 50 and the display device 52 may be located within the same device, such as a television. Alternatively, the receiver 50 and the display device 52 may be located in separate devices. For example, the receiver 50 may be located in a set-top box, such as a cable box, and display device 52 may be located in a television set. The receiver 50 is capable of receiving an air antenna, cable, satellite, or fiber optic broadcast media signal from an input interface 54. The receiver 50 includes the input interface 54, a processor unit 56, a memory 58 including a plurality of buffers 60, 62, 64, 66, a plurality of tuners 68, 70, 72, 74, a user interface 76, and a remote control 78.

The processor unit 56 may, for example, be the processor unit 16 in FIG. 1. The processor unit 56 provides the processing capabilities for the receiver 50. The memory 58 may, for example, be the memory 28 in FIG. 1. The memory 56 provides the data storage capabilities for the receiver 50. The data buffers 60, 62, 64, 66 may, for example, provide transient data storage for incoming broadcast media of selected channel numbers. Illustrative embodiments may, for example, provide a thirty minute data buffer for each tuner 68, 70, 72, 74. However, it should be noted that illustrative embodiments may provide more or less data buffer time for each tuner 68, 70, 72, 74. The illustrated embodiment shows tuners 68, 70, 72, 74, which receive television signals from the input interface 76. Each tuner 68, 70, 72, 74 is independently tunable to a given television channel.

Also shown in FIG. 1, is the user interface 76 through which a user selects and/or inputs desired commands and/or instructions to the receiver 50, including, for example, playback instructions, selected playback manipulations, channel viewing selections, powering on and off of the receiver 50, volume and other audio controls (e.g., balance, bass, treble, sound enhancement, etc.), picture setting controls (e.g., tint, color, contrast, brightness, etc.), accessing and using the receiver's recording features, accessing and using an electronic program guide (EPG), and all other communications from the user to the receiver 50. The user interface 76 is optionally implemented as a remote control 78, a front panel keypad, a graphical user interface (GUI), other known user interfaces, or a combination of any one or more of these. The user interface 60, in addition to being an input device, is also optionally an output device used to communicate operating conditions of the receiver 50 to the user, such as a current operational mode, a warning when memory is near its full capacity, and miscellaneous messages of interest to the user. The display device 52 displays video output to the viewer. The display device 52 may, for example, be a display screen in a television set or a computer monitor.

Figure 3:
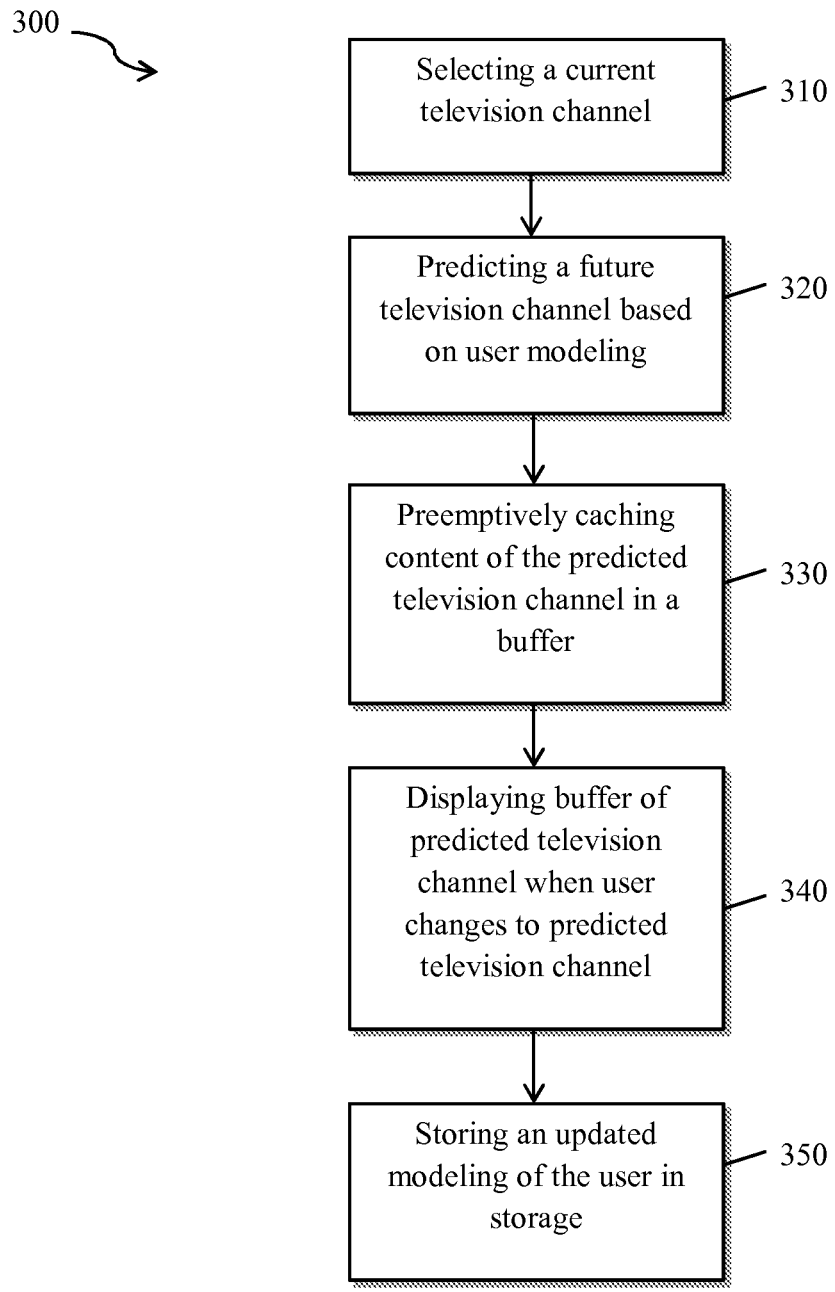
FIG. 3 depicts a flow diagram of an operation for preemptively caching television channels based on a modeling of the user according to an embodiment.

With reference now to FIG. 3, an operation 300 for preemptively caching future television channel selections based on a modeling of the user according to an exemplary embodiment is shown. In block 310, a current television channel is selected using a tuner. A user may change channels using the user interface 76 and/or remote control 78 to adjust the tuner to a desired channel. For example, a user may press the "up" or "down" button on the user interface 76 and/or remote control 78 or enter the channel selection manually via a numeric keypad on the user interface 76 and/or remote control 78. Additionally, a user may change channels via an EPG implemented in the user interface 76.

According to an exemplary embodiment, a future television channel selection of a user is predicted based on a modeling of the user, as shown in block 320. A user profile is created using a weighted list of attributes that are used to predict future channel selections of the user.

The user profile of an embodiment may store attributes relating to the user's "mood" by evaluating the speed or rhythm of channel zapping by the user over a region of a tuner over a predetermined time period. For example, if the user is wildly zapping channels in a certain region of the tuner (e.g., channels relating to movies, science shows, governmental channels, etc.), this data is stored in the user profile as a factor to assess in the prediction of future channel selections of the user.

The user profile of an embodiment may also store attributes relating to an evaluation of a collaborative rating among related users in a social network. The collaborative rating is determined by an indication of approval or disapproval for programming related to a particular channel or sets of channels by users of the social network. A social network may be comprised of registered users who live in the same vicinity, share the same interests, or share the same demographic. According to this embodiment, the channel likely to be selected next by the user may be the outcome of the collaborative rating among the related users.

According to another embodiment, the user profile may store attributes relating to an evaluation of the user's preferences selected from a group comprising a genre or topic of a program, an actor or actress of the program, and a time of the program. For example, an embodiment may predict that channel 7 is going to be selected next by the user because in the past, on Saturday from 1:00-1:05 p.m., the user has visited channel 7 when the topic is on cooking with a particular celebrity actress.

Additionally, the user profile may store attributes relating to an evaluation of a direction (e.g., "up" or "down") the user usually channel surfs over a predetermined amount of time, a zapping history of the user over a predetermined period of time, and a particular channel that a user usually selects after a given channel while zapping.

In situations where a user manually enters a channel using a numeric keypad of the user interface 76 and/or remote control 78, the prediction of a future television channel selection includes an evaluation of channels the user commonly enters when performing a manual entry according to an embodiment. As soon as the user enters the number "2", an embodiment determines all possible outcomes—(e.g., 002, 020, 021, 022, 023 . . . 200, 201, 202, etc.)—or the most likely outcomes based on factors such as a user's favorite shows in the 200-299 channel range. As a new number is entered, the list of possible entry combinations is further reduced and the prediction of the user's next channel selection is stronger in probability.

An embodiment will also observe which channels the user most commonly enters when performing a manual entry. Moreover, an embodiment will examine the current channel a user is tuned to while starting a manual entry. For example, if it is determined that a user is currently tuned to channel 19, then channel 20 is not likely to be the next selection because a single channel "up" key would have been more efficient then the manual entry. Thus, the mere use of manual numerical entry may be used to predict which channel will be selected next.

The prediction of a future channel selection by the user may compensate for manual channel entry errors according to an embodiment. Often, when users enter channel information using a numeric keypad of the user interface 76 and/or remote control 78, a typing error may occur. This may adversely affect the prediction of the channel selection and decrease the user's satisfaction with channel zapping. Accordingly, an embodiment includes a channel checker that presents predicted replacement channels for channel entry errors based on a selected one or more factors from a group comprising a time of a day, a user interest, a nearby keypad number, and a user history. For each number in the entered channel, the channel checker checks for nearby numbers on the numeric keypad to predict the most likely replacement channels. For example, the number 7 is near the number 8 on the numeric keypad, and thus a user may be more likely to mistype the number 8 instead of the number 7 than the user would mistype the number 3 instead of the number 7.

An embodiment monitors a user's history of channel entry corrections when presenting lists of alternative replacement channels to the user. For example, if a user is often typing the number 205 when the user intended to type the number 204, this is monitored and stored in the user profile. Aggregate tables of corrections for more than one user may be maintained, shared, and provided by the channel checker of an embodiment. An auxiliary window displays a user's most frequently or most recently channel entry errors and predicted replacement channels according to an embodiment. The user can use a clipboard facility to copy and paste channels of interest from the auxiliary window to a current specification of desired channels to surf.

The attributes in the user profile may be assigned various priorities so that one approach may be weighted over another. The priorities may be determined by manual input of a user or automatically provided by the system software.

In block 330, program content of the predicted future television channel is cached preemptively using a spare tuner according to an embodiment. The user's predicted channel selection is preemptively cached based on the user profile created in block 330. The caching of recorded content may comprise a plurality of tuners and a plurality of respective memory buffers. In an embodiment, the caching of recorded content includes storing content of one or more channels immediately above or below the current channel in one or more buffers when a continuous pressing of an "up" or "down" button by a user on the user interface 76 and/or remote control 78 is detected.

In block 340, a buffer of the recorded content of the predicted future television channel is displayed when the user switches from the current television channel to the predicted future television channel according to an embodiment. For example, when the user switches from the current channel to the predicted channel, an embodiment immediately displays a one second buffer of recorded content from the spare tuner while waiting for the current tuner to switch over to the predicted channel. Accordingly, the delay experienced while switching digital channels is eliminated.

In block 350, an updated modeling of the user is stored in storage according to an embodiment. Newly evaluated attributes of the user encountered while predicting the user's future channel selection in block 320 are stored in the user profile in storage 34.

The storage 34 may store a plurality of user profiles for predicting and preemptively caching future channel selections. In an embodiment, a button on the remote control 78 is used to specify a user currently using the remote control 78. According to another embodiment, a user may be identified when using their personal cellular telephone as the remote control 78. The user's tolerance of delay may be automatically estimated according to an embodiment. In other words, a user who rapidly hops between channels is probably less tolerant of delays than a user who is a very slow channel surfer. As an example, it is possible that a younger user hops faster than an elderly user. This toleration factor may be taken into account when determining how much recorded content to buffer and how many channels to begin buffering.

Figure 4:
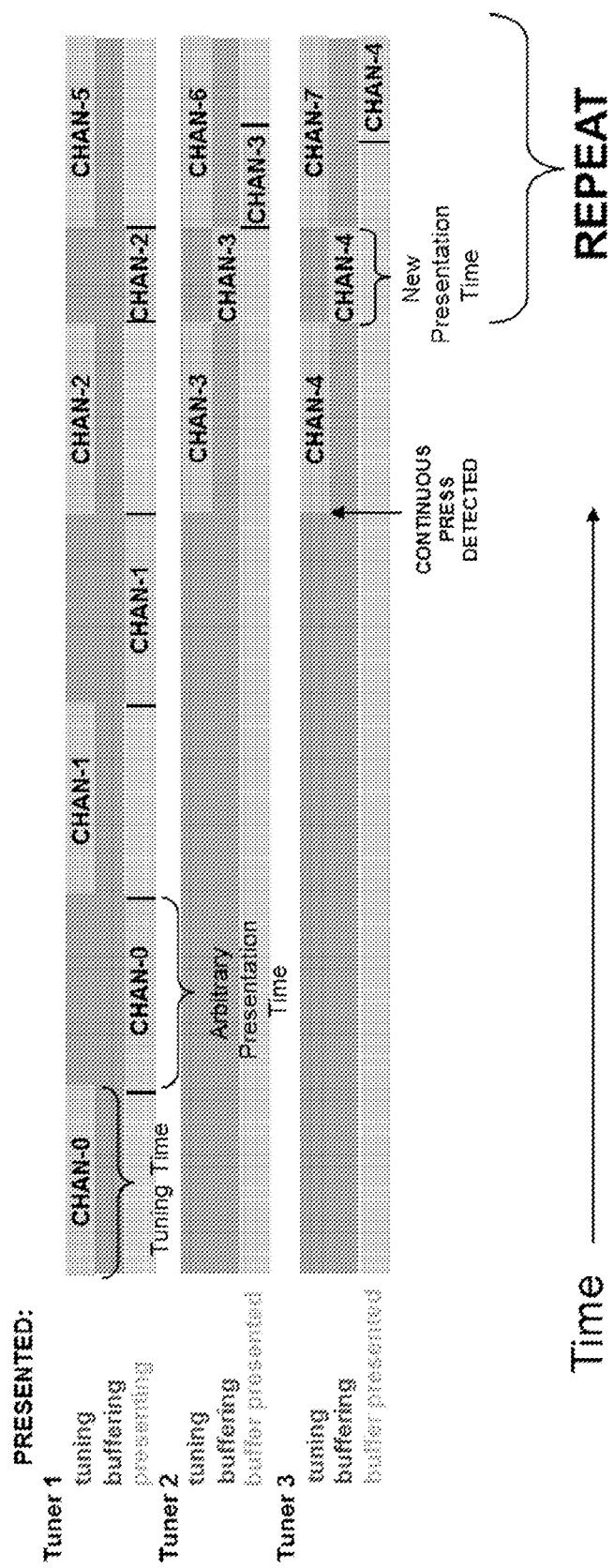
FIG. 4 depicts an operation for preemptively caching television channels during a continuous press channel entry by a user according to an embodiment.

Referring to FIG. 4, an operation for preemptively caching television channels during a continuous press channel entry by a user according to an embodiment is shown. When the user has entered a mode of continuous presses of either the "up" or "down" button on the user interface 76 and/or remote control 78, an embodiment uses a three tuner system capable of cutting channel change delays in half.

When a user selects a channel by pressing the "up" or "down" button, tuner 1 switches to a selected channel (n) and displays the program content of the selected channel (n). After a predetermined amount of time, if the user maintains the press of either the "up" or "down" button, an embodiment uses tuner 2 to tune to the next channel (n+1) in the selected direction beyond the channel (n) that the tuner 1 is simultaneously tuning. At the same time, tuner 3 is tuned to channel (n+2). The display of channel (n) proceeds for a time equal to approximately one half the time it took tuner 1 to tune to channel (n) (i.e., the tuning time). Channels (n+1) and (n+2) are buffered by tuners 2 and 3 during approximately one half of the presentation time of channel (n) by tuner 1.

The buffered channel (n+1) is displayed upon system request to present the channel (n+1). The buffered display of recorded content requires no tuner and the buffer display time equals approximately one half of the tuning time. During this time, tuners 1, 2 and 3 begin tuning channels (n+3), (n+4), and (n+5). The buffered channel (n+2) is displayed upon system request to present the channel (n+2). Once again, the buffered display of recorded content requires no tuner and the buffer display time equals approximately one half of the tuning time. During this time, tuners 1, 2, and 3 finish tuning channels (n+3), (n+4), and (n+5). Channel (n+3) is displayed and simultaneously channels (n+4) and (n+5) are buffered for a time equal to approximately one half of the amount of time it takes to tune. According to an embodiment, subsequent channel selections by a user are handled in this same manner while the continuous press is detected.

This embodiment may generalized such that the time to change a channel can be reduced by any proportion of the actual tuning time equal to $1/(m-1)$, where m is the number of tuners. In an embodiment, m should not increase beyond what is required to reduce the channel changing time to a duration that is both useful to the user (e.g., conveys information about channel content) and not burdensome to the user (e.g., when the delay is too long).

The method of embodiments of the present invention may be implemented over firmware update to existing equipment. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method, comprising:
   receiving a user selected current television channel using a first tuner;
   predicting, with a processing device, a future television channel selection of the user based on a modeling of the user;
   caching recorded content of the predicted future television channel preemptively using a second tuner;
   displaying a buffer of the recorded content of the predicted future television channel when the user switches from the current television channel to the predicted future television channel; and
   storing an updated modeling of the user in storage,
   wherein a button on a remote control is used to specify the user currently using the remote control, and
   wherein the modeling of the user includes an evaluation of a collaborative rating among related users in a social network and is determined by an indication of approval or disapproval for programming related to sets of channels by users of the social network.

2. The computer-implemented method of claim 1, wherein the caching of recorded content includes a plurality of tuners and a plurality of memory buffers.

3. The computer-implemented method of claim 1, wherein the modeling of the user includes an evaluation of a speed or rhythm of channel zapping by the user over a region of a tuner over a predetermined time period.

4. The computer-implemented method of claim 1, wherein the collaborative rating is determined by an indication of approval or disapproval for programming related to the current channel by users of the social network.

5. The computer-implemented method of claim 1, wherein the modeling of the user includes an evaluation of the user's preferences selected from a group comprising a genre or topic of a program, an actor or actress of the program, and a time of the program.

6. The computer-implemented method of claim 1, wherein the predicting of a future television channel selection includes an evaluation of channels the user commonly enters when performing a manual entry.

7. The computer-implemented method of claim 1, wherein the predicting of a future television channel selection includes a compensation for channel entry errors, the compensation including a channel checker that presents predicted replacement channels for channel entry errors based on a selected one or more from a group comprising a time of a day, a user interest, a nearby keypad number, and a user history.

8. The computer-implemented method of claim 7, wherein an auxiliary window displays a user's most frequently or most recently channel entry errors and predicted replacement channels.

9. The computer-implemented method of claim 1, wherein the caching of recorded content includes storing content of one or more channels immediately above or below the current channel in one or more buffers when a continuous pressing of an up or down button on a remote control is detected.

10. The computer-implemented method of claim 1, wherein the modeling of the user includes an evaluation of a direction of channel zapping by the user.

11. The computer-implemented method of claim 1, wherein the modeling of the user includes an evaluation of a zapping history of the user over a predetermined period of time.

12. A computer program product comprising:
a non-transitory computer readable storage medium having computer readable program code stored thereon that, when executed, performs a method, the method comprising:
receiving a user selected current television channel using a first tuner;
predicting, with a processing device, a future television channel selection of the user based on a modeling of the user;
caching recorded content of the predicted future television channel preemptively using a second tuner;
displaying a buffer of the recorded content of the predicted future television channel when the user switches from the current television channel to the predicted future television channel; and
storing an updated modeling of the user in storage,
wherein a button on a remote control is used to specify the user currently using the remote control, and
wherein the modeling of the user includes an evaluation of a collaborative rating among related users in a social network and is determined by an indication of approval or disapproval for programming related to sets of channels by users of the social network.

13. The computer-implemented method of claim 1, wherein the social network is comprised of registered users who live in the same vicinity, share the same interests, and share the same demographic.

* * * * *